(12) United States Patent
Onizuka et al.

(10) Patent No.: US 6,787,114 B2
(45) Date of Patent: Sep. 7, 2004

(54) METHOD AND APPARATUS FOR WET TYPE FLUE-GAS DESULFURIZATION

(75) Inventors: Masakazu Onizuka, Hiroshima-ken (JP); Toru Takashina, Hiroshima-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/169,080

(22) PCT Filed: Nov. 14, 2001

(86) PCT No.: PCT/JP01/09954
§ 371 (c)(1),
(2), (4) Date: Jul. 8, 2002

(87) PCT Pub. No.: WO02/40137
PCT Pub. Date: May 23, 2002

(65) Prior Publication Data
US 2003/0012706 A1 Jan. 16, 2003

(30) Foreign Application Priority Data

Nov. 17, 2000 (JP) .......................... 2000-351802
Sep. 11, 2001 (JP) .......................... 2001-275254

(51) Int. Cl.⁷ .............................................. B01D 53/50
(52) U.S. Cl. ...................... 422/172; 422/168; 422/169; 422/170; 422/224
(58) Field of Search .................... 422/168–172, 422/177, 224–225, 231, 234; 423/555

(56) References Cited

U.S. PATENT DOCUMENTS

| | | | |
|---|---|---|---|
| 4,483,805 A | 11/1984 | Glindsjö | 261/117 |
| 6,190,620 B1 * | 2/2001 | Shinoda et al. | 422/171 |
| 2001/0000725 A1 | 5/2001 | Shinoda et al. | 422/172 |

FOREIGN PATENT DOCUMENTS

| | | |
|---|---|---|
| EP | 0 490 298 | 6/1992 |
| EP | 1 029 579 | 8/2000 |
| JP | 62-194423 | 12/1987 |
| JP | 4-137731 | 12/1992 |
| JP | 05-285331 | 11/1993 |
| JP | 07-031841 | 2/1995 |
| JP | 08-950 | 1/1996 |

* cited by examiner

Primary Examiner—Hien Tran
(74) Attorney, Agent, or Firm—Oblon, Spivak, McClelland, Maier & Neustadt, P.C.

(57) ABSTRACT

A wet type exhaust gas desulfurization apparatus includes a liquid reservoir which reserves absorption liquid containing absorbent and sulfite, a desulfurizing system which removes sulphur dioxide from combustion exhaust gas and forms sulfite, and an air supplying and circulating device which has a reduction section and supplies air to said liquid reservoir using a negative pressure generated due to said reduction section to oxidize the sulfite.

17 Claims, 7 Drawing Sheets

PRIOR ART Fig. 4B
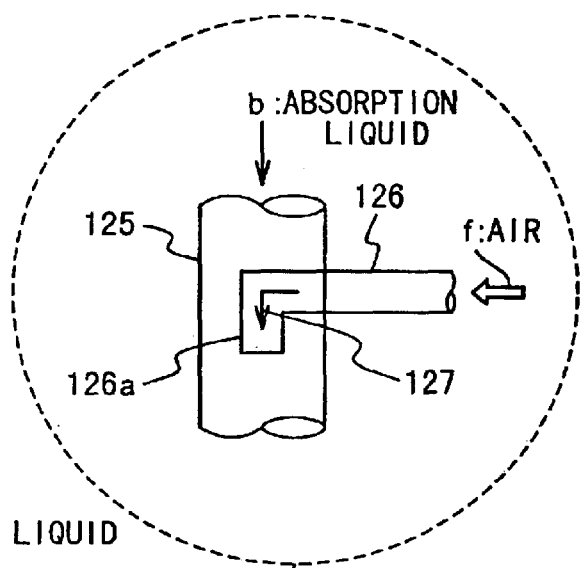
Fig. 4A
PRIOR ART
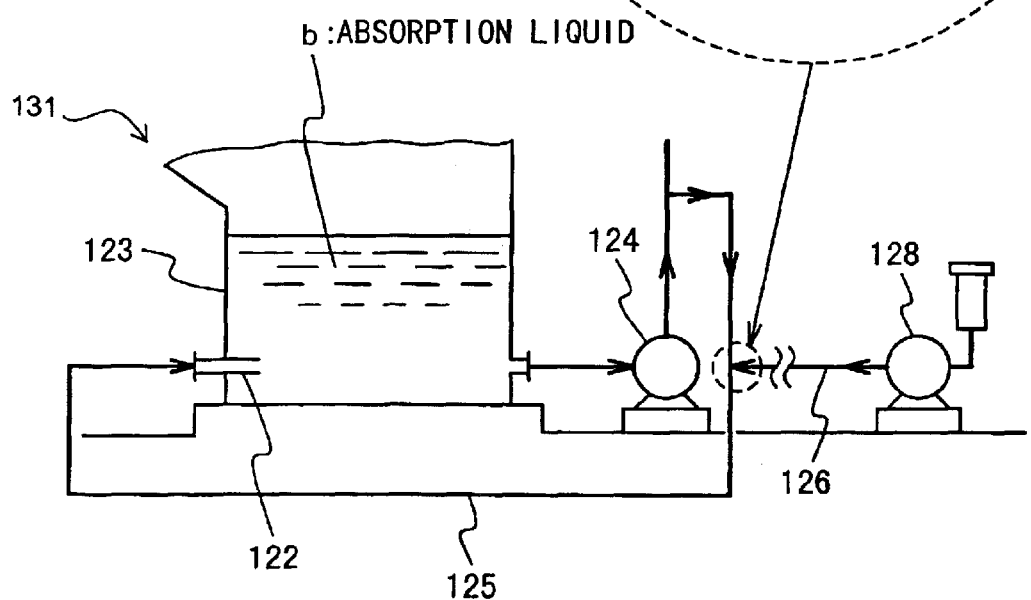

METHOD AND APPARATUS FOR WET TYPE FLUE-GAS DESULFURIZATION

TECHNICAL FIELD

The present invention relates to a wet type exhaust gas desulfurization apparatus and method.

BACKGROUND ART

Conventionally, in spaces for production and residence such as a plant and a building, an incinerator like a boiler is used. Such an incinerator burns fuel. In this time, if being contained in the fuel, the sulfur component is exhausted as sulphur dioxide ($SO_2$) gas without being fixed in ash. The sulphur dioxide gas is showered on the ground as acid rain and affects a human body, an animal, and natural environment. Generally, the incinerator is provided with an exhaust gas desulfurization apparatus not to affect adverse influence.

Most of the exhaust gas desulfurization apparatuses installed in the large-sized combustion facilities are a wet type. In the wet type exhaust gas desulfurization apparatus, the exhaust gas is made to contact alkaline absorption liquid like limewater and the sulphur dioxide gas is changed into sulfite. In this way, the sulfite is absorbed in the absorption liquid and is removed. Moreover, the sulfite is oxidized with air and is changed into sulfate. For the oxidation reaction, generally, the technique is adopted in which air is spouted into the absorption liquid.

In the technique in which the air is spouted into the absorption liquid, it is demanded to make the oxidation reaction effective. Therefore, various kinds of techniques are conventionally developed.

FIG. 1 shows a first conventional example of the wet type exhaust gas desulfurization apparatus. The first conventional example of the wet type exhaust gas desulfurization apparatus 101 is provided with an absorption tower 102 which carries out a wet type desulfurization, and a liquid reservoir 103 is arranged below the absorption tower 102 to reserve alkaline absorption liquid b. Alkali absorbent a such as lime is introduced into the absorption liquid b. The absorption liquid b is pumped up into the absorption tower 102 through a pipe 105 by a circulation pump 104 and is sprayed by spray pipes 106. Combustion exhaust gas d is introduced from the top of the absorption tower 102, contacts the sprayed alkali absorption liquid b. Thus, sulphur dioxide gas in the exhaust gas reacts with the alkaline absorbent and is changed into sulfite. The sulfite is absorbed by the absorption liquid and falls into the liquid reservoir 103 and is collected therein. Air d is spouted into the absorption liquid a containing the sulfite by a blower 107. The blower 107 is connected with a plurality of nozzle headers 108 which are arranged in the bottom of the liquid reservoir 103. The air is spouted into the absorption liquid b from a discharge port 110 provided at the tip of an air supply nozzle 109 extending from each nozzle header 108. The sulfite in the absorption liquid b reacts with the spouted air and is changes to sulfate. The sulfate stoichiometrically equivalent to the sulphur dioxide absorbed in the absorption liquid b is discharged as waste fluid c. Absorption efficiency in the oxidation technique by the above air blowing method is mainly influenced based on the contact area between air and the absorption liquid.

FIG. 2 shows a second conventional example of the wet type exhaust gas desulfurization apparatus 111. In the second conventional example, the wet type exhaust gas desulfurization apparatus 111 is composed of stirrer 112. The stirrer 112 has stirring wings 113, and the stirring wings 113 are rotated in the absorption liquid of the liquid reservoir 103. The air is supplied by a blower 107 and spouted into the absorption liquid b from a discharge port 114 arranged in the front of the stirring wings 113. The spouted air accompanies a spouted stream generated by the stirring wing 113 and is distributed into the absorption liquid b. This technique can promote the oxidation reaction by the distribution of air.

Japanese Laid Open Utility Model Application (JP-A-Heisei 4-137731) shows a third conventional example of the wet type exhaust gas desulfurization apparatus 121 shown in FIG. 3. A plurality of jet nozzles 117 are provided to generate jet streams 116 in a predetermined angle into the radial directions of the liquid reservoir 115. The plurality of jet streams 116 are provided at a predetermined height, and the jet stream from the jet nozzle 117 turns to the circumferential direction of the liquid reservoir 115. An absorption liquid pipe 119 is arranged in the bottom of the jet nozzle 117 to pass through the liquid reservoir 115, and a jet stream pump 118 is provided on the way of the pipe 119. The opening of an air supply pipe 120 is provided on the way of the absorption liquid pipe 119. Air f is sucked from the air supply pipe 120 by the absorption liquid flowing though the absorption liquid pipe 119 and is spouted into the liquid reservoir 115 from the jet nozzles 117 together with the absorption liquid b. This technique can promote the mixing of the absorption liquid and the air more.

FIG. 4A shows a fourth conventional example of the wet type exhaust gas desulfurization apparatus 131. A discharge pipe 122 penetrates the circumferential wall of the liquid reservoir 123. Absorption liquid is sucked from a liquid reservoir 123 by a liquid pump 124 and circulated through a circulation liquid pipe 125 and a discharge pipe 122. As shown in FIG. 4B, the end of the air blow pipe 126 is inserted into the circulation liquid pipe 125 on the way of circulation liquid pipe 125. The direction 127 of an air output portion 126a of the air blow pipe 126 is almost coincident with the flowing direction of the absorption liquid in the circulation liquid pipe 125. The air is pressurized by a blower 128 and is outputted from the end of the air blow pipe 126 into the direction 127. In this way, the air is mixed with the absorption liquid b in the circulation liquid pipe 125 and is spouted from a discharge pipe 122 in the absorption liquid in the liquid reservoir 123.

The first to fourth conventional examples are superior in the oxidation promotion but the following problems are remained.

In the first conventional example, a checking work of the liquid reservoir 103 is troublesome, because a lot of air supply nozzles 109 are arranged on the whole bottom surface of the liquid reservoir 103.

In the second conventional example, the rising stream is generated due to air lift operation which accompanies the spouting of the air from the discharge port 114. The rising stream promotes a narrow region circulation in which the stirring wing 113 absorbs and stirs a part of the liquid again. As a result, the outreach of the stirred liquid stream becomes short and the stirring efficiency decreases.

In the third and fourth conventional examples, air is supplied from the way of the jet nozzle 117 which is connected with absorption liquid pipe 119 or the discharge pipe 122 which is connected with circulation liquid pipe 125. Therefore, while air bubbles flow through the absorption liquid pipe 119 or circulation liquid pipe 125 together with the liquid, the air bubbles combine and enlarge. As a result, the jet stream is separated into an air phase and an absorption liquid phase. Even if the mixture stream of the air and the liquid is spouted from the jet nozzle 117 or discharge pipe 122 in such a condition, the air bubbles are not uniformly distributed and the perfect oxidation is difficult. Also, the inside of the pipe becomes easy for cavitation erosion.

Therefore, the more increase of the contact area between the liquid and air and the large improvement of the stirring and dispersing capability of the absorption liquid are demanded. Also, it is demanded that the increase and the improvement are achieved in a wide region and uniformly. Furthermore, the large reduction in the number of air supply nozzles and the simplification of the checking work are demanded.

DISCLOSURE OF INVENTION

Therefore, an object of the present invention is to provide a wet type exhaust gas desulfurization apparatus and a wet type flue gas desulfurization method in which the contact area between liquid and air can be increased largely.

Another object of the present invention is to provide a wet type exhaust gas desulfurization apparatus and a wet type flue gas desulfurization method, in which air and absorption liquid are sufficiently stirred and can be distributed.

Still another object of the present invention is to provide a wet type exhaust gas desulfurization apparatus and a wet type flue gas desulfurization method, in which the number of air supply nozzles can be decreased largely, so that power can be reduced.

Yet still another object of the present invention is to provide a wet type exhaust gas desulfurization apparatus and a wet type flue gas desulfurization process method, in checking work can be made easy through the simplification of the structure of the liquid reservoir.

In an aspect of the present invention, a wet type exhaust gas desulfurization apparatus includes a liquid reservoir which reserves absorption liquid containing absorbent, wherein sulfite is contained in the absorption liquid; a sulfur dioxide removing system which removes sulphur dioxide from combustion exhaust gas and forms sulfite; and an air supplying and circulating system which has a reduction section, and which supplies air to the liquid reservoir using a negative pressure generated due to the reduction section to oxidizes the sulfite.

Here, the air supplying and circulating system may include a nozzle, wherein a discharge port of the nozzle is opened in the absorption liquid of the liquid reservoir; a first pump which circulatively supplies the absorption liquid in the liquid reservoir to the nozzle; a pipe which connects the nozzle and a side of the discharging port of the first pump; the reduction section arranged between the pipe and the nozzle; and an air suction pipe arranged on a downstream side from the reduction section and connected with the nozzle. The reduction section has a reduction section hole which has an effective cross section narrower than an effective cross section of the pipe. The air is sucked through the air suction pipe, flows in the nozzle with the absorption liquid, and is spouted into the absorption liquid of the liquid reservoir to oxidize the nitrite.

Also, it is desirable that a distance between a center line of the reduction section in a direction orthogonal to a direction of a flow path in the nozzle and a center line of the air suction pipe is shorter than twice of an effective diameter of an absorption liquid spouting stream path in the nozzle. In this case, it is further desirable that the effective diameter of the reduction section hole is set to a range of 0.5 to 0.8 times of the effective diameter of the absorption liquid spouting stream path.

Also, it is desirable that the internal circumference surface of the reduction section hole has smoothly increased diameter in a direction of a downstream side. Also, it is desirable that an opening peripheral portion of the reduction section hole on the upstream side sharply sticks out into a direction of the upstream side.

Also, the nozzle may have an extension pipe, and it is desirable that the extension pipe extends from outside of the liquid reservoir into the absorption liquid in the liquid reservoir.

Also, it is desirable that a central axis of a flow path formed in the nozzle is inclined with respect to a liquid surface in the liquid reservoir.

Also, it is desirable that the air suction pipe is connected with the nozzle in a one end and is opened into atmosphere in the other end.

Also, it is desirable that the air suction pipe has an upper portion and a lower portion, and the lower portion is fixed on the nozzle and the upper portion is supported by the lower portion movably in upper and lower directions. In this case, it is desirable that the opening of the air suction pipe opened to the atmosphere is set to a position higher than the liquid surface of the absorption liquid in the liquid reservoir, when the pump stops.

Also, the nozzle may includes a lower pipe provided on a downstream side from the reduction section; and an extension pipe connected with the lower pipe on a downstream side, and it is desirable that the extension pipe is fixed to the liquid reservoir and the lower pipe is connected with the extension pipe detachably.

Also, the sulphur dioxide removing system may include an absorption tower in which the combustion exhaust gas containing the sulphur dioxide is introduced; a spray pipe provided in a lower portion of the absorption tower; and a second pump which supplies the absorption liquid from the liquid reservoir to the spray pipe such that the absorption liquid is sprayed from the spray pipe into the absorption tower.

Also, in another aspect of the present invention, a wet type exhaust gas desulfurization method is achieved by sucking liquid in a liquid reservoir containing chemical substance as an oxidation object and forming a flow of the liquid; by reducing the flow of the liquid in diameter; by introducing air into a negative pressure region generated due to the reduction to generate a mixture stream of air and liquid; and by spouting the mixture stream into the liquid reservoir.

Also, it is desirable that a spouting direction of turns down with respect to a liquid surface of said liquid reservoir.

BRIEF DESCRIPTION OF THE DRAWINGS

FIGS. 4A and 4B are cross sectional views showing a fourth conventional example of the exhaust gas desulfurization apparatus;

BEST MODE FOR CARRYING OUT THE INVENTION

Hereinafter, the wet type exhaust gas desulfurization apparatus of the present invention will be described in detail with reference to the attached drawings.

Figure 1:
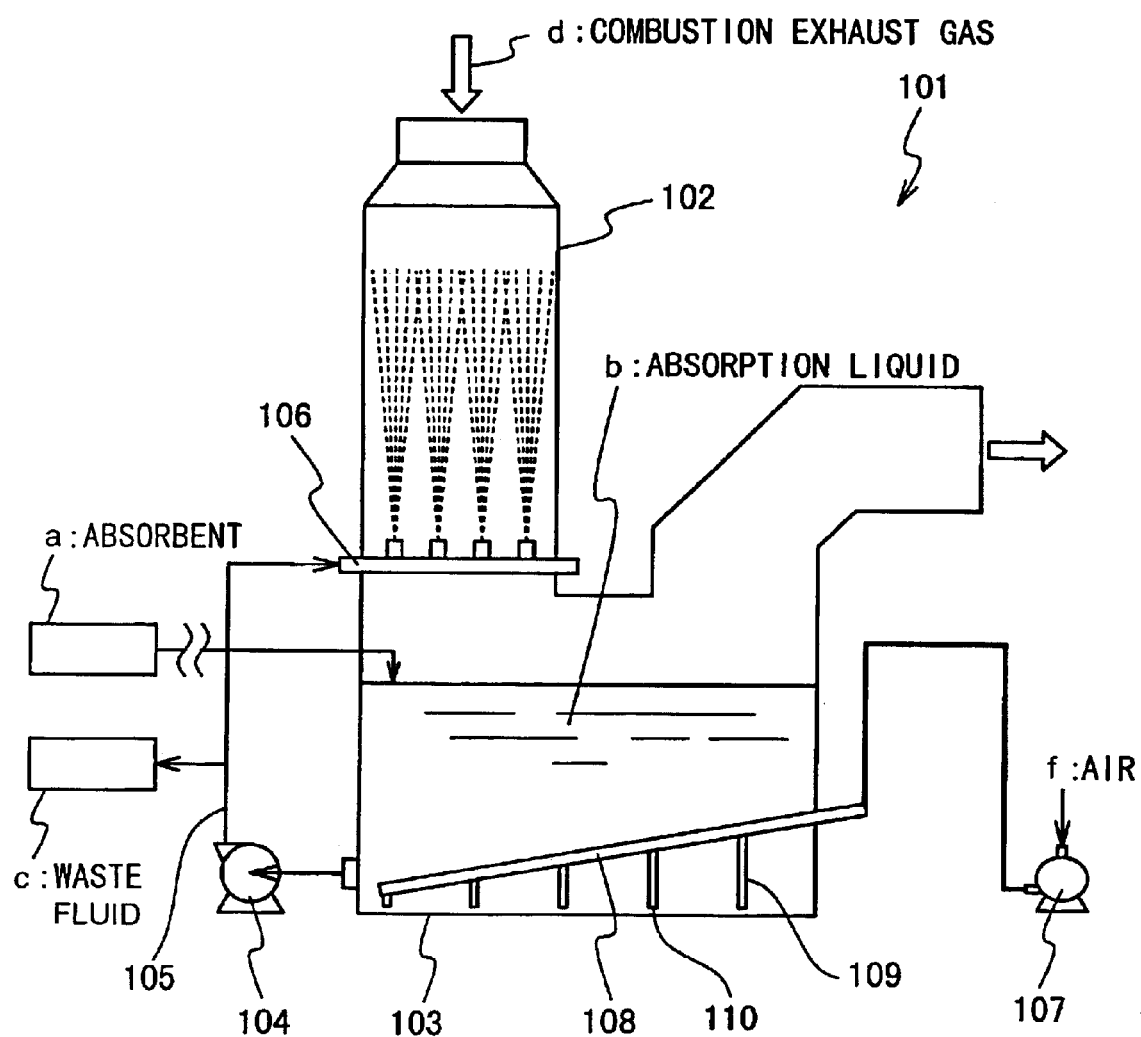
FIG. 1 is a cross sectional view showing a first conventional example of an exhaust gas desulfurization apparatus.
Figure 2:
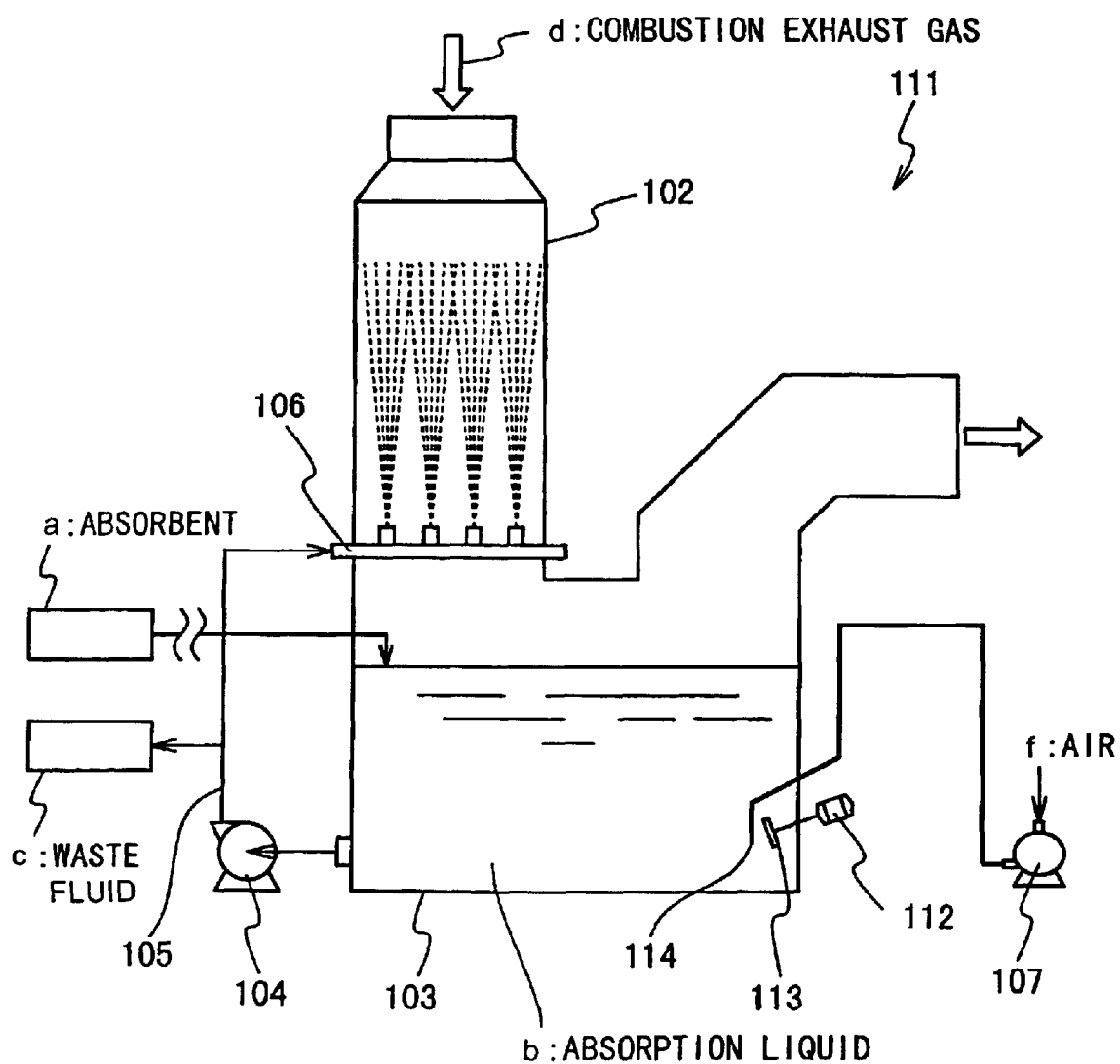
FIG. 2 is a cross sectional view showing a second conventional example of the exhaust gas desulfurization apparatus.
Figure 3:
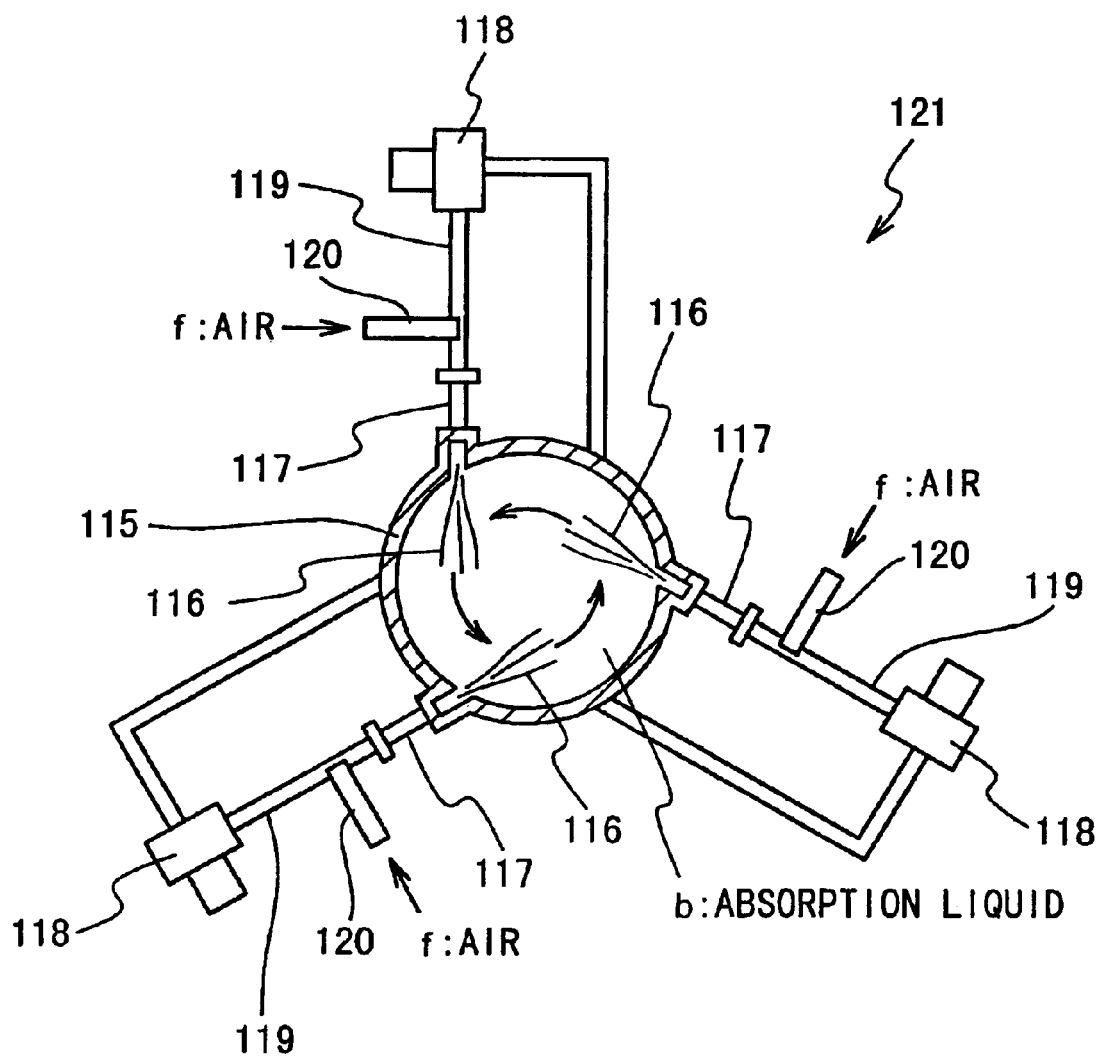
FIG. 3 is a cross sectional view showing third conventional example of the exhaust gas desulfurization apparatus.
Figure 5:
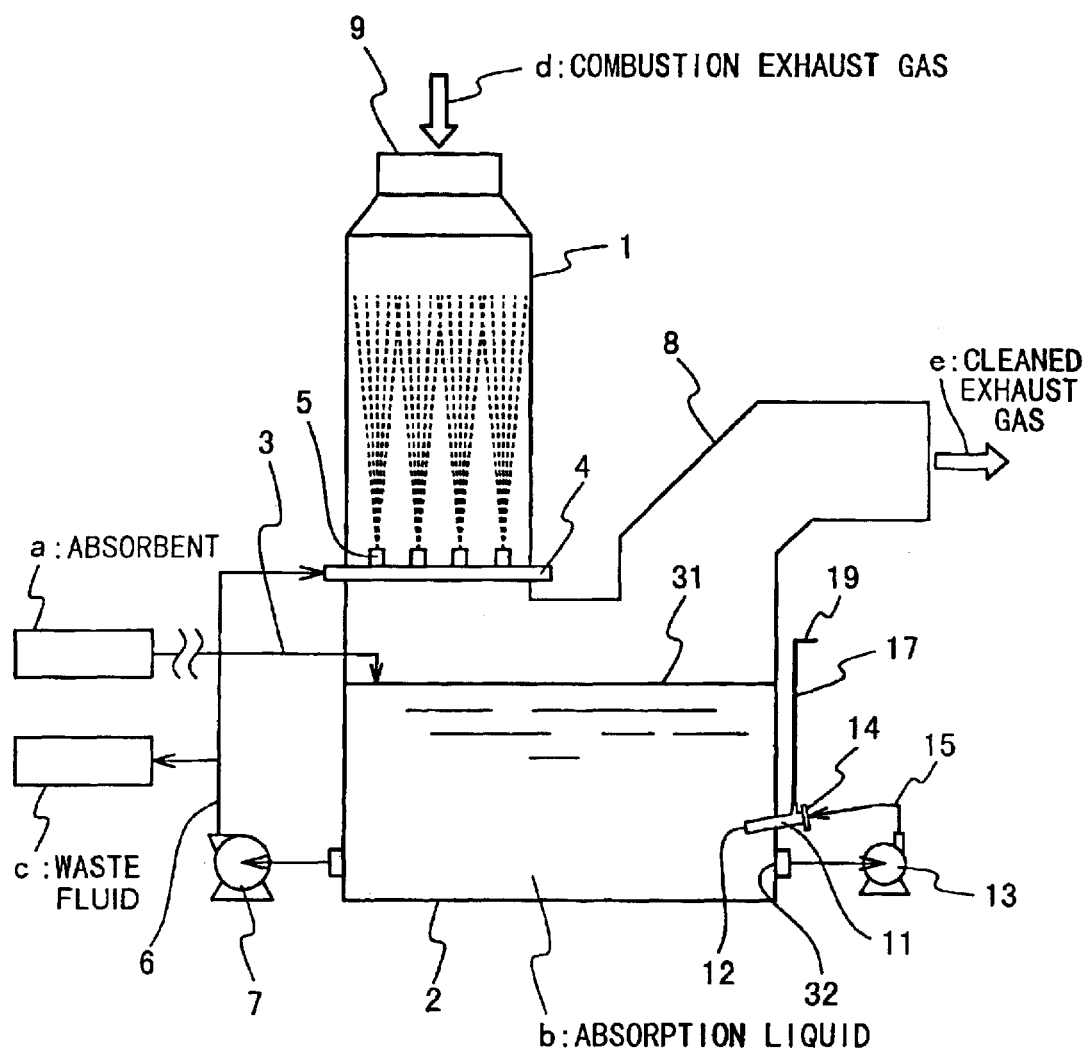
FIG. 5 is a cross sectional view showing a wet type exhaust gas desulfurization apparatus of the present invention.

FIG. 5 shows the wet type exhaust gas desulfurization apparatus according to the first embodiment of the present invention. Referring to FIG. 5, an absorption tower 1 is provided together with a liquid reservoir 2 to carry out a wet type desulfurizing process. The absorption tower 1 is arranged above the liquid reservoir 2. Water is introduced into the liquid reservoir 2. Absorbent a is introduced into the water from the water surface through a pipe 3. The absorption liquid b is formed of the water and the absorbent a.

In the sulphur dioxide absorption system, spray pipes 4 are arranged in the lower portion of the absorption tower 1. A lot of the absorption liquid discharge ports 5 are provided for the spray pipes 4 to spray the absorption liquid into the upper direction in the tower 1. The lower portion of the absorption tower 1 is opened, the inner space of the absorption tower 1 is connected with the upper portion of the inner space of the liquid reservoir 2. A circulation pipe 6 is arranged between the liquid reservoir 2 and the spray pipes 4 to circulate the absorption liquid b. A circulation pump 7 is interposed in the pipe 6. The absorption liquid in the liquid reservoir 2 is pumped up by the circulation pump 7 and is spouted from the absorption liquid discharge ports 5 of the spray pipes 4. A part of the absorption liquid b which is pumped up by the circulation pump 7 is discharged as waste fluid c.

An uptake 8 is provided in the upper portion of the liquid reservoir 2. The region under the uptake 8 extends to the inner space of the liquid reservoir 2. The combustion exhaust gas d is exhausted from a combustion equipment (not shown) like a boiler and is introduced from an upper introduction port 9 of the absorption tower 1 thereinto. The combustion exhaust gas after sulphur dioxide gas is removed is exhausted from the end of the uptake 8 into the atmosphere as a cleaned exhaust gas e.

In an air supply system, a nozzle 11 is arranged in the bottom of the liquid reservoir 2 to penetrate the circumferential wall of the liquid reservoir 2. A discharge port 12 is formed at the tip of the nozzle 11. The absorption liquid b is sucked up from the liquid reservoir 2, and spouted from the nozzle 11 through a pipe 15.

Figure 6:
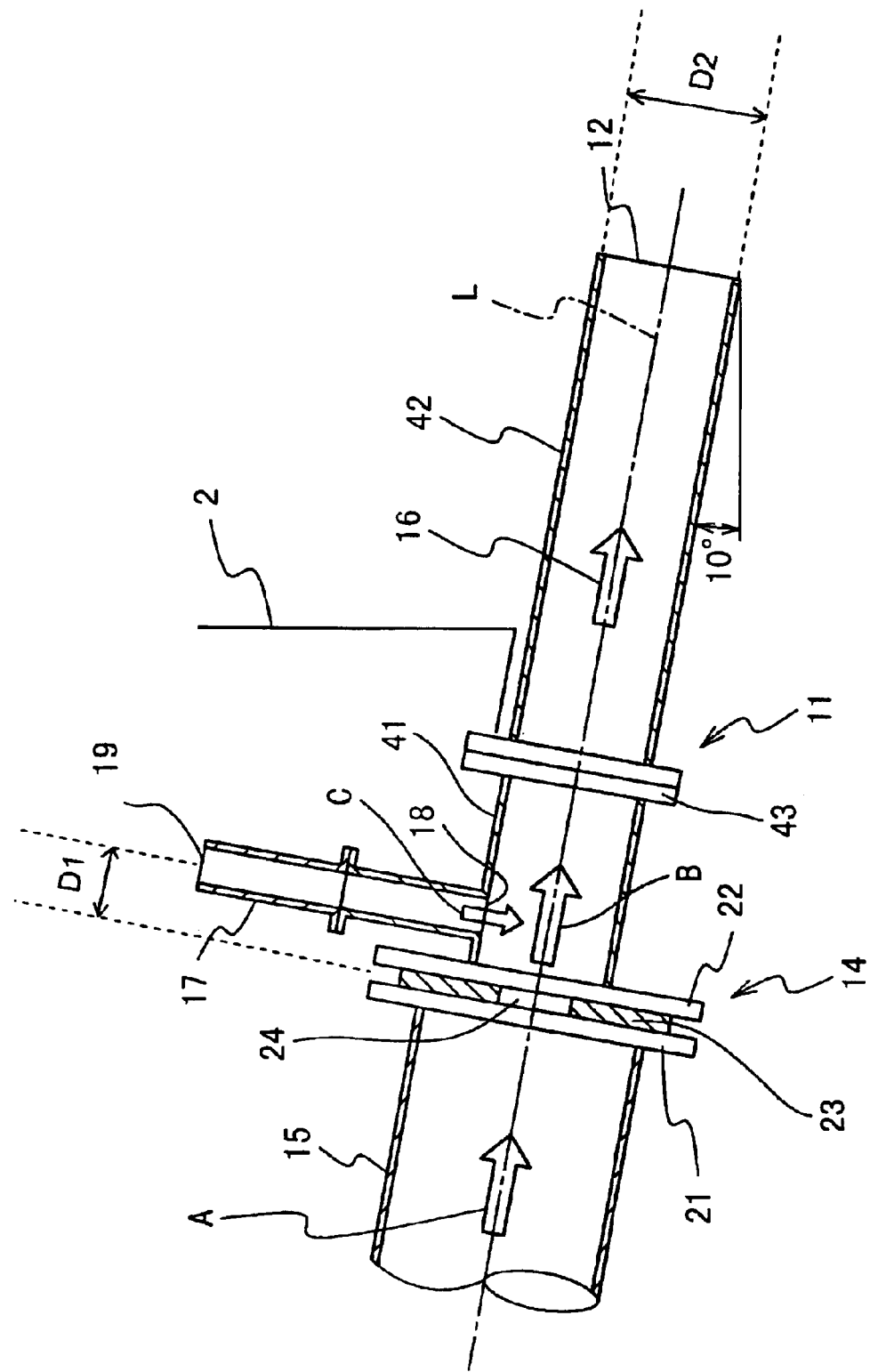
FIG. 6 is a cross sectional view showing the spouting nozzle in the wet type exhaust gas desulfurization apparatus according to the first embodiment of the present invention.

As shown in FIG. 6, the nozzle 11 has a reduction section 14. The reduction section 14 and the discharge side of the pump 13 are connected by the pipe 15. A pipe 41 is provided on the downstream side of the reduction section 14 into a direction of the discharge port 12 of the nozzle 11. A long extension pipe 42 is connected with the pipe 41 by joining flanges 43. The discharge port 12 is formed as an opening at the tip of the extension pipe 42. The extension pipe 42 extends to form an absorption liquid spouting stream path 16 formed as an inner flow path in the nozzle 11 into the liquid reservoir 2.

An air suction pipe 17 is connected with the pipe 41 in which the absorption liquid spouting stream path 16 is formed. The air suction pipe 17 has an opening 18 on the downstream side of the reduction section 14 for the absorption liquid spouting stream path 16. Especially, the air suction pipe 17 has the opening in the circumferential surface portion of the pipe 41 on the downstream side of the reduction section 14. The other end of the air suction pipe 17 has an opening 19 opened to the atmosphere. The height position of the opening 19 is set to be higher than the liquid surface of the liquid reservoir 2. As shown in FIG. 6, the central axis L of the absorption liquid spouting stream path 16 is inclined with respect to the horizontal plane by about 10 degrees so that the downstream side is lower than the upstream side.

The reduction section 14 has a flange 21 on the side of the pipe 15, a flange 22 on the side of the discharge port 12 and a reduction section plate 23. The reduction section plate 23 has a reduction section hole 24. The central axis of the reduction section hole 24 in the direction of the spouting stream path is coincident with the central axis L of the spouting stream path. The size of the reduction section hole 24 is properly designed based on the variables and constants such as the cross section of the absorption liquid spouting stream path 16, the spouting stream rate per a unit time of the pump 13.

The alkali absorption liquid b is sucked by a circulation pump 7, is pumped up onto the spray pipes 4 and is sprayed from the plurality of absorption liquid discharge ports 5 of the spray pipes 4 in an almost straightly upward direction. In this way, the lime component of the sprayed alkali absorption liquid b contacts and reacts with sulphur dioxide gas of the combustion exhaust gas d introduced from the upper end introduction port 9 of the absorption tower 1. Thus, the sulphur dioxide is changed to sulfite. The cleaned exhaust gas e after the sulphur dioxide is removed passes through the uptake 8 and is discharged outside. The absorption liquid b containing the sulfite becomes shaped like liquid drops and falls down into the liquid reservoir 2 in accordance with gravitation.

The mixture steam of air and absorption liquid is spouted from the discharge port 12 of the nozzle 11 into the liquid reservoir 2 as described later. The sulfite in the absorption liquid contacts air, is oxidized and changed to sulfate. The absorption liquid containing a high concentration of sulfate is discharged as waste fluid c. The absorbent a such as lime is supplemented into the liquid reservoir 2.

The mixture steam of the air and liquid spouted from the nozzle 11 is generated in the neighborhood of the opening 18 of the air suction pipe 17. The flow A of the absorption liquid discharged from the pump 13 receives resistance of the reduction section plate 23 of the reduction section 14, passes through the reduction section hole 24, and flows into the neighborhood of the opening 18 as a flow B, as shown in FIG. 6. Therefore, a negative pressure region is generated in the neighborhood of the opening 18. That is, the pressure in the neighborhood of the opening 18 is more decreased than the pressure in the opening 19. Therefore, the air flows into the depressurized region forcefully as an air stream C through the air suction pipe 17. The flow B of the absorption liquid is changed into a turbulent stream, and is stirred, and the air stream C is joined to the flow B of the absorption liquid. The air stream is changed to the flow of minute air bubbles by the contraction stream peeling effect. The combination and enlargement of the air bubbles is more effectively prevented if the diameter of the minute air bubble is smaller. The mixture stream of air and liquid in the absorption liquid spouting stream path 16 in the nozzle 11 keeps such a turbulent stream stirring characteristic. The mixture stream of air and liquid is spouted from the discharge port 12 of the nozzle 11 into the absorption liquid in the liquid reservoir 2 as a bubble stream. Such a bubble stream is spouted as a liquid stream with the inclination of about 10 degrees, and flows along the bottom surface of the liquid reservoir 2 and reaches a distant place. Because the bubble stream is fast, the bubble stream reaches the distant place before the air bubbles are combined. At this time, the air bubbles float up to the surface of the absorption liquid a while keeping the minute air bubble state. Therefore, the minute air bubbles contact the absorption liquid with a large contact area to promote the oxidation of sulfite.

When the absorption liquid passes through the reduction section holes 24 of the reduction section 14, the negative pressure region is generated on the downstream side from the reduction section 14 due to the absorption liquid contraction stream peeling effect. The air is sucked from the opening of the air suction pipe 17 to the negative pressure region in correspondence to the negative pressure generated by the flow of the absorption liquid. The sucked air is mixed with the absorption liquid stream B to produce the mixture stream of air and liquid. The mixture stream of air and liquid is spouted from the discharge port 12 of the nozzle 11 into the absorption liquid a in the liquid reservoir 2 as a strong jet stream. At this time, the mixture stream of air and liquid receives a dispersion effect from the absorption liquid a. Therefore, the mixture stream of air and liquid forms a large stream in the absorption liquid a in the liquid reservoir 2, accompanied by a wake. A mixture stream of air and liquid accompanied by the wake has large momentum, and is distributed in the wide region of the liquid reservoir 2. The region where the mixture stream of air and liquid is spouted and the absorption liquid a accompanies the mixture stream is effective to the distance which is determined based on the discharging diameter and discharging pressure of the mixture stream of air and liquid, and the density of the absorption liquid a from the discharge port 12. Therefore, narrow region circulation does not occur. Also, the air bubbles in the mixture stream of air and liquid accompanied by the wake are distributed into the discharging direction while being forcefully confined in the wake. Thus, it is effectively prevented that the air bubbles combine with each other to produce a large air bubble.

In the first embodiment, the air is sucked using the negative pressure region which is formed on the way of the discharging nozzle for generating the jet stream, unlike the third and fourth conventional examples in which the air is mixed on the sufficiently upstream side from the discharging nozzle 4. Thus, the mixture stream of air and liquid is formed. The air is sucked based on the difference between the pressure in the negative pressure region and the atmospheric pressure, and is sheared by the flow of the absorption liquid to produce a lot of minute air bubbles. In this way, the mixture stream of air and liquid is formed. The air bubbles taken into the absorption liquid a receive shearing stress not after spouting but in the discharging nozzle, and is changed into the minute air bubbles which are distributed. Moreover, the air bubbles made in this way are forcefully spouted outside the discharging nozzle, and are carried to the distant place in the large flow accompanied by the wake, while keeping the minute bubble state. Therefore, the combination of the air bubbles does not occur in the pipe 42, and the air bubbles are distributed in the wide region of the absorption liquid. Also, there is no case that the separation of air and the absorption liquid occurs to produce 2-phase stream.

The minute air bubbles distributed in the wide region in this way contact the absorption liquid with a large area and can oxidize sulfite in the absorption liquid efficiency. Because a single nozzle has the sufficiently large oxidation ability, it is possible to reduce the number of nozzles, which become troublesome in the check cleaning work. Because the large flow is generated, the discharging position of the mixture stream of air and liquid can be freely set. Because the pump 13 does not catch air bubbles, the power of the pump can be reduced. The increase of the flow by the occurrence of the wake promotes a stirring effect. The air supply blower is not always necessary. The oxidation in a high efficiency, especially perfect oxidation can be realized without any blower, as described later.

DEMONSTRATION EXAMPLE

The specification of a demonstration apparatus is as follows:

(1) The cross section of the absorption tower 1 was 4 square meters and the effective height of the absorption tower 1 was 12 m to the spray pipe 4.

(2) The cross section of the liquid reservoir 2 was 2 m×4 m and the relative height from the bottom to the spray pipe 4 was 3.5 m.

(3) The two spray pipes 4 are provided and the nominal diameter is 150 A. Four absorption liquid discharge ports 5 with the nominal diameter of 40 A and the length of 100 mm were provided to direct an upward direction.

(4) The nominal diameter of the pipe 15 was 150 A.

(5) The nominal diameter of the nozzle 11 was 100 A and the hole diameter of the reduction section hole 24 was 75 mm. The discharging port 12 was set to the height position of 0.5 m from the floor (bottom) surface in the horizontal position of 0.4 m from the side wall (the side walls oppose to each other in the distance of 2 m). An obliquity angle of the centerline L of the flow path of the nozzle 11 to the floor surface (the horizontal plane) was set to 10 degrees.

(6) The nominal diameter of the air suction pipe 17 is 40 A. The distance between the center line of the air suction pipe 17 and the center line of the reduction section 14 in a reduction plane direction was set to 100 mm.

(7) The height position of the opening 19 in the other end of the air suction pipe 17 was higher by 1 m than the liquid surface.

In such a demonstration apparatus, the uniform oxidation proceeded in the wide region and the above-mentioned perfect oxidation became possible through the smooth oxidation.

The height of the liquid surface 31 of the absorption liquid b in the liquid reservoir 2 was set to about 2.5 m from the bottom. A relative height between a liquid suck port 32 provided on the side wall of the liquid reservoir 2 for the pump 13 and the liquid surface 31 was set to 2 m. The horizontal position of the discharge port 12 was set to 0.4 m from the inner surface of the side wall where the liquid suck port 32 was opened. The circulation pipe 6 was used to suck the absorption liquid of 200 cubic meters per an hour. The air suction pipe 17 sucked the air of 180 cubic meters N per an hour from the opening 19.

The combustion exhaust gas d of 40,000 cubic meters N per an hour containing about 1,000-ppm $SO_2$ was introduced into the absorption tower 1. On the other hand, the absorption liquid b 500 cubic meters per an hour was pumped up by the circulation pump 7 and was sprayed from the spray pipes 4 into the absorption tower 1. The combustion exhaust gas d was subjected to a desulfurization process. Sulphur dioxide gas $SO_2$ reacted with the absorbent a (lime) which is stoichiometrically equivalent to the sulphur dioxide and the absorption liquid containing gypsum was discharged as waste fluid c.

The distance D1 between the center line of the air suction pipe 17 and the reduction plate 23 of the reduction section 14 in a plane direction is properly defined in accordance with hydrodynamics. It is desirable that the distance D1 is shorter than twice of the diameter D2 of the nozzle 11 (which is the diameter of the absorption liquid spouting stream path 16, especially, the diameter on the circular conversion of the effective cross section of the absorption liquid spouting stream path 16). If it is considered that the air can be efficiently sucked and the spouting stream can reach a distant place, it is desirable that the diameter of the reduction section hole 24 as a reduction diameter is 0.5 to 0.8 times of the diameter of the nozzle 11. Such definition is a guideline that the generation of the negative pressure region on the downstream side from the reduction section 14 becomes effective according to the flow in the pipe 15 in case of experiment. When the distance is long, the negative pressure region cannot be generated effectively.

Next, the discharging nozzle of the wet type exhaust gas desulfurization apparatus according to the second embodiment of the present invention will be described.

Figure 7:
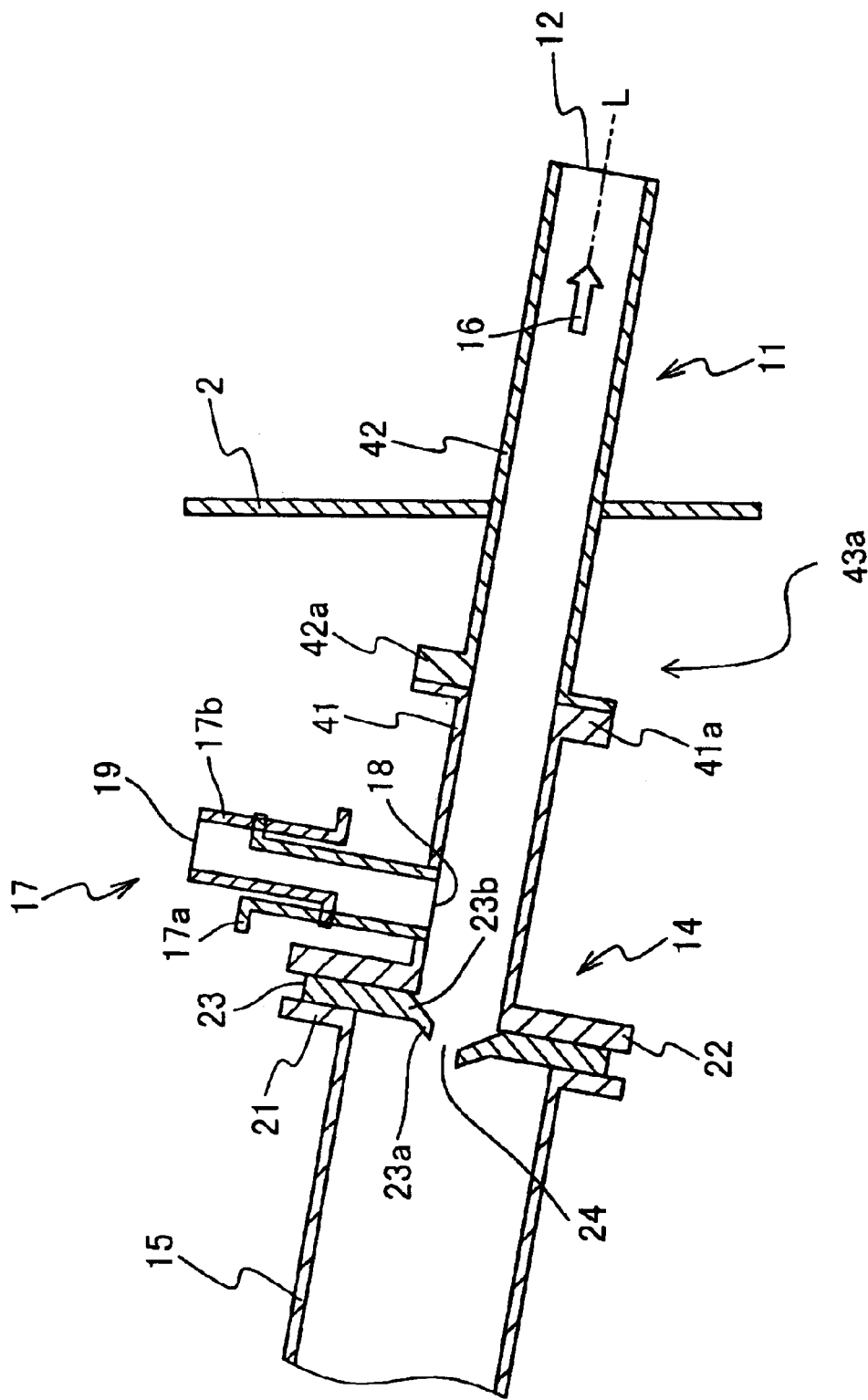
FIG. 7 is a cross sectional view showing the discharging nozzle of the second embodiment.

Referring to FIG. 7, in the nozzle of the wet type exhaust gas desulfurization apparatus in the second embodiment, a long extension pipe 42 is connected with the pipe 41 on the downstream side of the nozzle 11 between the reduction section 14 and the discharge port 12 by a joining flange section 43a. The discharging port 12 is formed as an opening at the tip of the extension pipe 42. The extension pipe 42 elongates the absorption liquid spouting stream path 16 and passes through the side wall of the liquid reservoir 2.

The air suction pipe 17 is connected with the pipe 41 for the absorption liquid spouting stream path 16. The air suction pipe 17 has an opening 18 for the absorption liquid spouting stream path 16 on the downstream side from the reduction section 14. Especially, the air suction pipe 17 has the opening in the circumferential surface portion of the pipe 41 on the downstream side. An opening 19 to the atmosphere is formed at the other end of the air suction pipe 17. When the pump 3 stops and the negative pressure region B is not generated, the liquid surface in the air suction pipe 17 liquid becomes equal to the liquid surfaces 31 of the liquid reservoir 2 in height. Therefore, the height position of the opening 19 is set to higher than the liquid surface 31 of the liquid reservoir 2. The central axis L of the absorption liquid spouting stream path 16 formed as a flow path in the nozzle 11 inclines with respect to the horizontal plane by about 10 degrees and the downstream side is lower than the upstream side.

The reduction section 14 has a flange 21 on the side of the pipe 15, a flange 22 on the side of the discharge port 12 and a reduction section plate 23. The reduction section plate 23 has a reduction section hole 24. The center line of the reduction section hole 24 in the stream direction is coincident with the central axis L of the absorption liquid spouting stream path 16. The size of the reduction section hole 24 is properly designed based on constants and variables such as the cross section of the absorption liquid spouting stream path 16, and the discharging flow rate per a unit time of the pump 13.

The air suction pipe 17 is formed as a double pipe and is composed of a fixed pipe 17a and a movable pipe 17b. When the pump 13 stops, the movable pipe is drawn up to a sufficiently high position such that the absorption liquid does not overflow. Because the liquid surface is lowered due to the absorption liquid discharging stream while the pump 13 is driven, the movable pipe 17b is lowered to a lower position. The full length of the air suction pipe 17 becomes short and the resistance of the internal circumference surface of the air suction pipe 17 becomes small in case of the suction of air from the opening 19 of the air suction pipe 17.

The flanges 41a and 42a for joining the pipe 41 and the extension pipe 42 in the nozzle 11 are assembled detachably. A plurality of thick portions of the flange 41a on the side of the pipe 41 are engaged with a plurality of ditch portions of the flange 42a on the side of the extension pipe 42. The extension pipe 42 is always mounted to the liquid reservoir 2. However, the unit containing the pipe 41 and the reduction section 14 is mounted to the extension pipe 42 detachably. Thus, the reduction section 14 is replaceable.

The reduction section plate 23 has the reduction section hole 24. The opening peripheral portion of the reduction section hole 24 has a portion protruding to the upstream side. In this way, the opening peripheral portion has a sharp angle at the tip on the upstream side and an un-sharp shape on the downstream side. The opening peripheral portion has the diameter increasing from the upstream side 23a to the downstream side 23b. That is, the internal circumference surface of the upstream side 23a and the internal circumference surface of the downstream side 23b form a continuously smooth and curved surface. The curved surface is formed like the cone surface of horn (or the quasi-cone surface). The cone surface becomes continuously larger in diameter in the opening of the downstream side rather than the opening of the upstream side. Also, as shown in FIG. 7, it is desirable that the tip of the reduction section 24 on the upstream side protrudes more on the side opposite to the opening 19 of the air suction pipe 17 than on the side of the opening 19 of the air suction pipe 17.

The absorption liquid stream in the pipe 15 is sheared and peeled off in the upstream side 23a and minute cavities are innumerably formed in the upstream side 23a. Moreover, such a large amount of minute cavities are dispersed in the absorption liquid stream which undergoes the negative pressure. The minute cavities are dispersed in this way. Moreover, the air bubbles introduced from the air suction pipe 17 into the absorption liquid stream under the negative pressure are effectively absorbed and dispersed in the absorption liquid.

As described above, according to the wet type exhaust gas desulfurization apparatus of the present invention, the contact region of the air and the liquid becomes uniformly wide regardless of position due to synergy effect of the wide region and the mixed phases. There is no ununiformity of the oxidation depending on the position and the perfect oxidation or approximately perfect oxidation can be realized.

What is claimed is:

1. A wet type exhaust gas desulfurization apparatus comprising:
    a desulfurizing device which forms sulfite to remove sulphur dioxide from combustion exhaust gas;
    a liquid reservoir which reserves absorption liquid containing absorbent and said sulfite; and
    an air supplying and circulating device having a reduction section which forms a depressurized region in a flow of said absorption liquid, said air supplying and circulating device being configured to introduce air to the depressurized region so as to supply said air to said liquid reservoir and oxidize said sulfite,
    wherein said reduction section includes a reduction section plate having a reduction section hole and a peripheral portion surrounding the reduction section hole, and the peripheral portion is protruding toward the upstream side of the flow.

2. The wet type exhaust gas desulfurization apparatus according to claim 1, wherein said air supplying and circulating device comprises:

a nozzle having a discharge port said liquid reservoir;

a first pump which circulatively supplies said absorption liquid in said liquid reservoir to said nozzle;

a pipe which connects said nozzle and a discharging port of said first pump; and an air suction pipe positioned on a downstream side of said reduction section and connected with said nozzle, wherein said reduction section is positioned between said pipe and said nozzle, said reduction section hole has an effective cross section narrower than an effective cross section of said pipe, and said air is introduced through said air suction pipe, flows in said nozzle with said absorption liquid, and is spouted into said liquid reservoir to oxidize said sulfite contained in said absorption liquid.

3. The wet type exhaust gas desulfurization apparatus according to claim 2, wherein said reduction section and said air suction pipe are positioned such that a distance between a center line of said reduction section in a direction orthogonal to a direction of a flow path in said nozzle and a center line of said air suction pipe is shorter than twice of an effective diameter of an absorption liquid spouting stream path in said nozzle.

4. The wet type exhaust gas desulfurization apparatus according to claim 3, wherein an effective diameter of said reduction section hole is set to a range of 0.5 to 0.8 times of said effective diameter of said absorption liquid spouting stream path.

5. The wet type exhaust gas desulfurization apparatus according to claim 2, wherein said reduction section hole is funnel-shaped and has an increased diameter toward a downstream side of the flow.

6. The wet type exhaust gas desulfurization apparatus according to claim 2, wherein said peripheral portion has an angled edge protruding toward the upstream side of the flow.

7. The wet type exhaust gas desulfurization apparatus according to claim 2, wherein said nozzle has an extension pipe which extends from outside of said liquid reservoir into said absorption liquid in said liquid reservoir.

8. The wet type exhaust gas desulfurization apparatus according to claim 2, wherein a central axis of said nozzle in a direction of the flow is inclined with respect to a liquid surface in said liquid reservoir.

9. The wet type exhaust gas desulfurization apparatus according to claim 2, wherein said air suction pipe is connected with said nozzle in one end and is opened into atmosphere in the other end.

10. The wet type exhaust gas desulfurization apparatus according claim 2, wherein said air suction pipe has an upper portion and a lower portion, said lower portion is fixed on said nozzle and said upper portion is supported by said lower portion movably in upper and lower directions.

11. The wet type exhaust gas desulfurization apparatus according to claim 10, wherein said air suction pipe is configured to set the other end opened to the atmosphere to a position higher than a liquid surface of said absorption liquid in said liquid reservoir, when said pump is stopped.

12. The wet type exhaust gas desulfurization apparatus according to claim 2, wherein said nozzle comprises:

a lower pipe provided on a downstream side of said reduction section; and an extension pipe connected with said lower pipe on a downstream side, wherein said extension pipe is fixed to said liquid reservoir and said lower pipe is connected with said extension pipe detachably.

13. The wet type exhaust gas desulfurization apparatus according to claim 2, wherein said desulfurizing device comprises:

an absorption tower in which said combustion exhaust gas containing said sulphur dioxide is introduced;

a spray pipe provided in a lower portion of said absorption tower;

a second pump which supplies said absorption liquid from said liquid reservoir to said spray pipe such that said absorption liquid is sprayed from said spray pipe into said absorption tower.

14. A wet type exhaust gas desulfurization apparatus comprising:

a desulfurizing device which forms sulfite to remove sulphur dioxide from combustion exhaust gas;

a liquid reservoir which reserves absorption liquid containing absorbent and said sulfite; and an air supplying and circulating device having a pipe, a nozzle, and a reduction section which forms a depressurized region in a flow of said absorption liquid and is positioned between said pipe and said nozzle, said air supplying and circulating device being configured to introduce air to the depressurized region so as to supply said air to said liquid reservoir through said pipe and said nozzle together with said absorption liquid and oxidize said sulfite, wherein a central axis of said nozzle is inclined with respect to a liquid surface in said liquid reservoir, and said reduction section includes a reduction section plate having a reduction section hole and a peripheral portion surrounding the reduction section hole, and the peripheral portion is protruding toward the upstream side of the flow.

15. The wet type exhaust gas desulfurization apparatus according to claim 14, wherein said air supplying and circulating device comprises:

a first pump that circulatively supplies said absorption liquid in said liquid reservoir to said nozzle having a discharge port opened in said liquid reservoir, said first pump having a discharging port connected to said pipe which connects said first pump and said nozzle; and an air suction pipe positioned on a downstream side of said reduction section and connected with said nozzle, wherein said reduction section is positioned between said pipe and said nozzle, said reduction section hole has an effective cross section narrower than an effective cross section of said pipe, and said air is sucked through said air suction pipe, flows in said nozzle with said absorption liquid, and is spouted into said liquid reservoir to oxidize said sulfite contained in said absorption liquid.

16. The wet type exhaust gas desulfurization apparatus according to claim 15, wherein said reduction section and said air suction pipe are positioned such that a distance between a center line of said reduction section in a direction orthogonal to a direction of a flow path in said nozzle and a center line of said air suction pipe is shorter than twice of an effective diameter of an absorption liquid spouting stream path in said nozzle.

17. The wet type exhaust gas desulfurization apparatus according to claim 16, wherein an effective diameter of said reduction section hole is set to a range of 0.5 to 0.8 times of said effective diameter of said absorption liquid spouting stream path.

* * * * *